(12) United States Patent
Rosenberger et al.

(10) Patent No.: US 12,209,045 B2
(45) Date of Patent: Jan. 28, 2025

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Enrico Ehrentraut, Hanau (DE); David Kostka, Hanau (DE); Martin Trommer, Hanau (DE); Steffen Weimann, Hanau (DE); Michael Hünermann, Hanau (DE); Kay Schuster, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 456 days.

(21) Appl. No.: 17/618,274

(22) PCT Filed: Jul. 15, 2020

(86) PCT No.: PCT/EP2020/069990
§ 371 (c)(1),
(2) Date: Dec. 10, 2021

(87) PCT Pub. No.: WO2021/009218
PCT Pub. Date: Jan. 21, 2021

(65) Prior Publication Data
US 2022/0363584 A1 Nov. 17, 2022

(30) Foreign Application Priority Data

Jul. 17, 2019 (EP) .................................... 19186745

(51) Int. Cl.
*C03B 37/027* (2006.01)
*C03B 37/012* (2006.01)

(52) U.S. Cl.
CPC .... *C03B 37/02781* (2013.01); *C03B 37/0122* (2013.01); *C03B 37/01257* (2013.01); *C03B 2203/16* (2013.01); *C03B 2203/42* (2013.01)

(58) Field of Classification Search
CPC ................................................ C03B 37/02781
See application file for complete search history.

(56) References Cited

U.S. PATENT DOCUMENTS

| | | | |
|---|---|---|---|
| 2003/0161599 A1* | 8/2003 | Broderick | C03C 25/1062 65/393 |
| 2003/0172682 A1 | 9/2003 | Sato et al. | |

(Continued)

FOREIGN PATENT DOCUMENTS

| | | |
|---|---|---|
| DE | 102004054392 A1 | 3/2006 |
| DE | 102005028219 B3 | 10/2006 |

(Continued)

OTHER PUBLICATIONS

Office Action issued Mar. 18, 2023 in CN Application No. 202080038448.6 (with English Summary).

(Continued)

*Primary Examiner* — Cynthia Szewczyk
(74) *Attorney, Agent, or Firm* — Panitch Schwarze Belisario & Nadel LLP (57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner bore and a cladding tube longitudinal axis along which a cladding tube wall extends that is delimited by an interior and an exterior; providing a number of tubular anti-resonant element preforms; arranging the anti-resonant element preforms at target positions of the interior of the cladding tube (Continued)

wall, thereby forming a primary preform which has a hollow core region and an inner jacket region; and elongating the primary preform in order to form the hollow-core fiber or further processing the primary preform in order to form a secondary preform. The aim of the invention is to achieve a high degree of precision and an exact positioning of the anti-resonant elements in a sufficiently stable and reproducible manner on the basis of the aforementioned methods. This is achieved in that a secondary preform is formed which has an outer diameter ranging from 30 to 90 mm, and at least one of the end faces of the anti-resonant element preforms is closed prior to drawing the fiber.

20 Claims, 1 Drawing Sheet

(56) References Cited

U.S. PATENT DOCUMENTS

| | | |
|---|---|---|
| 2003/0230118 A1 | 12/2003 | Dawes et al. |
| 2004/0096173 A1 | 5/2004 | Fekety et al. |
| 2005/0226578 A1 | 10/2005 | Mangan et al. |
| 2006/0046075 A1 | 3/2006 | Maul et al. |
| 2006/0130528 A1 | 6/2006 | Nelson et al. |
| 2008/0310806 A1 | 12/2008 | Mukasa |
| 2009/0019893 A1 | 1/2009 | Bogdahn |
| 2017/0045682 A1* | 2/2017 | Hoppe ................ C03B 37/0256 |
| 2019/0011634 A1* | 1/2019 | Lyngsøe et al. ... G02B 6/02328 |
| 2020/0278491 A1* | 9/2020 | Poletti ................ G02B 6/02328 |

FOREIGN PATENT DOCUMENTS

| | | |
|---|---|---|
| DE | 102014011041 A1 | 1/2016 |
| EP | 3136143 A1 | 3/2017 |
| GB | 2566466 A | 3/2019 |
| GB | 2583352 A | 10/2020 |
| WO | 02/072489 A2 | 9/2002 |
| WO | WO-2017032454 A1 * | 3/2017 ......... C03B 37/0122 |
| WO | 2018/169487 A1 | 9/2018 |
| WO | 2019/008352 A1 | 1/2019 |
| WO | 2019053412 A1 | 3/2019 |

OTHER PUBLICATIONS

Examination Report issued Aug. 2, 2023 in Indian Application No. 202247001691.

International Search Report and Written Opinion mailed Sep. 14, 2020 by the European Patent Office in its capacity as International Searching Authority for counterpart international patent application No. PCT/EP2020/069990 (with English translations attached).

Jasion, Gregory T. et al., "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).

Kosolapov, A.F. et al., "Hollow-core revolver fibre with a double-capillary reflective cladding" Quantum Electronics 46 (3) Mar. 29, 2016 pp. 267-270 (DOI: 10.1070/QEL15972).

Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).

Poletti, Francesco "Nested antiresonant nodeless hollow core fiber," Optics Express, vol. 22, No. 20 (2014) pp. 23807-23828 (DOI:10.1364/OE 22.023807).

Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).

Yu, Fei, "Chapter 4—Fabrication of hollow core negative curvature fibre" IN "Hollow core negative curvature fibres" University of Bath PhD. pp. 59-74, Dec. 31, 2013 (XP055656461).

* cited by examiner

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal fiber axis and a sheath region surrounding the hollow core, which sheath region comprises a number of anti-resonance elements, comprising the method steps of:
  (a) providing a primary preform for the hollow-core fiber, having a hollow core region and a sheath region comprising at least one cladding tube having an inner cladding tube bore and a longitudinal cladding tube axis, along which a cladding tube wall delimited by an inner sheath surface and an outer sheath surface extends, wherein a number of tubular and/or hollow channel-shaped anti-resonance element preforms are arranged in the sheath region,
  (b) further processing the primary preform into a secondary preform, the further processing comprising a singular or repeated implementation of one or more of the following hot-forming processes:
    (i) elongation
    (ii) collapse and simultaneous elongation,
    (iii) collapse of additional sheath material and subsequent elongation,
    (iv) collapse of additional sheath material and simultaneous elongation, and
  (c) drawing the hollow-core fiber from the secondary preform, The invention also relates to a method for producing a preform for an anti-resonant hollow-core fiber comprising a hollow core extending along a longitudinal axis of the fiber and the sheath region surrounding the hollow core, which sheath region comprises a plurality of anti-resonance elements, comprising the method steps of:
  (a) providing a primary preform for the hollow-core fiber, having a hollow core region and a sheath region comprising at least one cladding tube having an inner cladding tube bore and a longitudinal cladding tube axis, along which a cladding tube wall delimited by an inner sheath surface and an outer sheath surface extends, wherein a number of tubular and/or hollow channel-shaped anti-resonance element preforms are arranged in the sheath region, and
  (b) further processing the primary preform into a secondary preform, the further processing comprising a singular or repeated implementation of one or more of the following hot-forming processes:
    (i) elongation
    (ii) collapse and simultaneous elongation,
    (iii) collapse of additional sheath material and subsequent elongation,
    (iv) collapse of additional sheath material and simultaneous elongation.

Conventional single-mode optical fibers made of solid material have a core region made of glass, which is surrounded by a sheath region made of glass with a lower refractive index. Light guidance is thereby based on total reflection between the core and the cladding region. However, the interactions of the guided light with the solid material are associated with an increased latency in data transmission and relatively low damage thresholds with respect to high-energy radiation.

These disadvantages are prevented or reduced by "hollow core fibers" in which the core comprises an evacuated cavity filled with gas or liquid. In hollow-core fibers, the interaction of the light with the glass is less than in solid core fibers. The refractive index of the core is less than that of the sheath, so that light guidance via total reflection is not possible and the light would normally escape from the core into the sheath. Depending on the physical mechanism of the light guidance, hollow-core fibers are subdivided into "photonic bandgap fibers" and "anti-resonance reflection fibers."

Given "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which what are known as "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges), and a low latency in data transmission.

Potential applications of the hollow core fibers lie in the fields of data transmission; high-power beam guidance, for example for material processing; modal filtering; non-linear optics, in particular for super-continuum generation, from the ultraviolet to infrared wavelength range.

A disadvantage of anti-resonant hollow-core fibers is that higher-order modes are not necessarily suppressed, so that they are often not exclusively single-mode over long transmission lengths and the quality of the output beam deteriorates.

In the paper by Francesco Poletti "Nested anti-resonant nodeless hollow core fiber," Optics Express, vol. 22, No. 20 (2014), DOI: 10.1364/OE 22.023807, a fiber design is proposed in which anti-resonance elements are not designed as a simple singular structural element but rather are composed of several nested structural elements. The nested anti-resonance elements are designed such that higher-order core modes are phase-matched to the sheath modes and are suppressed, but not the fundamental core mode. As a result, the propagation of the fundamental core mode is always ensured, and the hollow-core fiber can be effectively single-mode over a limited wavelength range.

The effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type") in which the core can conduct further modes in addition to the fundamental mode. For this purpose, it is surrounded by an inner sheath having "non-resonant elements" which provide a phase-matching of anti-resonant modes with the higher modes. The hollow-core fiber is produced according to what is known as a "stack-and-draw technique" by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers in which a first sheath region comprises a plurality of rods and a second sheath region comprises a plurality of tubes surrounded by an outer cladding tube. Rods, tubes, and cladding tube are joined to form a preform by means of the "stack and draw" technique. Before the preform is elongated, the preform end is sealed which is done by applying a sealing compound. For example, a UV adhesive is used as the sealing compound.

Technical Object

Anti-resonant hollow core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the setpoint geometry can be caused by the configuration of the fiber preform, and they can also occur through undesired deformations that are not true to scale in the fiber drawing process.

In the known "stack and draw" technique, many elements are to be joined together with positional accuracy. For example, in order to produce the hollow-core fiber known from the aforementioned paper in the "NANF" design, six anti-resonance element preforms, respectively consisting of an outer anti-resonance element tube (ARE outer tube, for short) and, welded on one side to the inner sheath surface of the ARE outer tube, an inner anti-resonance element tube (ARE inner tube, for short), must be attached to the inner side of a cladding tube.

In order to achieve low attenuation values and broad transmission ranges, the azimuthal position of the anti-resonance elements within the cladding tube is also important, in addition to a uniform wall thickness of the walls of the anti-resonance elements. This cannot be realized without further measures with the "stack and draw" technique. The object of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the method for producing the anti-resonant hollow-core fiber, this object is achieved according to the invention, starting from a method of the aforementioned genus, in that a secondary preform is formed which has an outer diameter in the range of 30 to 90 mm, and in that at least one of the end-face ends of the anti-resonance element preforms is closed before drawing the hollow-core fiber in accordance with method step (c).

The starting point for producing the anti-resonant hollow-core fiber is a preform, referred to here as a "primary preform." It comprises a cladding tube, in which or on which precursors or preforms for the shaping of anti-resonance elements are contained in the hollow-core fibers (referred to here as "anti-resonance elements" for short). The primary preform can be elongated to form the hollow-core fiber; however, as a rule, additional sheath material is added to the primary preform in order to produce therefrom a preform referred to here as a "secondary preform." Optionally, the hollow-core fiber is produced by elongating the secondary preform. Alternatively, the primary preform or the secondary preform are surrounded by a collecting cylinder or a plurality of collecting cylinders to form a coaxial ensemble of components, and the coaxial ensemble is elongated directly to form the hollow-core fiber. The general term "preform" is understood here to refer to that component or that coaxial ensemble of components from which the hollow-core fiber is ultimately drawn.

The addition of sheath material comprises collapsing a collecting cylinder onto the primary preform. The coaxial arrangement of primary preform and collecting cylinder is elongated or is not elongated when the collecting cylinder is collapsed. The anti-resonance element preforms are thereby changed in their shape or arrangement, or they are not changed in their shape or arrangement.

The production of the preform comprises a number of method steps in which starting elements of the hollow-core fiber are produced and positioned in relation to one another, and at least one hot-forming step. Each of the starting elements has a certain deviation from its setpoint geometry, and each step of positioning and shaping inevitably leads to geometry deviations that sum up into an absolute geometry error in the finished preform. In particular, the hot-forming of glass can lead to an undesired and non-reproducible deformation given the slightest deviations from an ideal, normally cylindrically symmetrical temperature profile of the heating zone.

The preform used in the method according to the invention for the fiber-drawing process is characterized by an outer diameter in the range of 30 to 90 mm, preferably in the range of 40 to 90 mm. This is a large outer diameter in comparison to the present prior art. Since, with increasing outer diameter of the preform, the existing absolute geometry errors are scaled down more strongly during fiber drawing, a more precise manufacturing of the hollow-core fiber is thus made possible in principle.

However, it has been shown that an arbitrary enlargement of the outer diameter of the preform does not automatically lead to a more precise hollow-core fiber, but rather that the following boundary conditions must be observed in order to maintain a maximum relative geometry error of 3.5% in the wall thickness of anti-resonance elements in the hollow-core fiber.

I. The outer diameter of the preform is at most 90 mm. Given larger diameters, temperature gradients are formed within the preform volume in the fiber-drawing process, resulting in deviations of more than 3.5% in the wall thickness in the anti-resonance elements in the hollow-core fiber. The reference value for the % specification is the mean wall thickness.

II. The outer diameter of the preform is at least 30 mm, preferably at least 40 mm. It has been shown that anti-resonance element preforms can be realized in which the wall thickness deviation is approximately 4 µm. Given outer diameters of the preform smaller than 30 mm, this absolute error in the preforms leads to a relative error of more than 3.5% in the wall thickness of the anti-resonance elements in the finished hollow-core fiber.

III. All anti-resonance element preforms, or at least a portion, form hollow channels and are normally open on both sides. The free internal diameter of the hollow channels is small and is typically in the range of a few millimeters in the preform. In the hot-forming process, the preform is heated from the outside so that a radial temperature gradient appears in the preform volume. Given otherwise identical process conditions, the thicker the preform, the greater the gradient. There is the risk that the hollow channels shrink differently as a result of the surface tension and as a function of the local temperature. The greater the radial temperature gradient and the thicker the preform, the greater this risk. By contrast, the temperature gradient has no significant effects on the central hollow core.

In order to address this effect in the relatively thick preforms according to the invention, the core region (hollow core) is left open in the fiber-drawing process with a vertical orientation of the longitudinal axes, but the otherwise open upper end is closed in at least a portion of the anti-resonance element preforms.

Accordingly, in a preferred method, only the upper end-face end of the anti-resonance element preforms is respectively closed before drawing the hollow-core fiber in a vertical alignment in accordance with method step (c).

The sealing of the anti-resonance element preform or anti-resonance element preforms takes place before the start of the fiber-drawing process, and it also remains during the fiber-drawing process. By sealing the upper end, each hollow channel has an initial gas volume. In the fiber-drawing process, the gas is heated and the pressure in the hollow channels is increased so that they expand starting from the bottom toward the top. Since the gas exchange in the narrow hollow channels is small and the hot gas cannot escape upward, the temperature difference between the lower and upper preform ends significantly determines the extent of expansion, and in fact substantially independently of the original hollow channel diameter. However, this temperature difference is approximately the same for all hollow channels, independently of their radial position, so that all hollow channels expand to approximately the same extent. The original distribution of the hollow channel sizes in the thick preform is thereby also maintained in the final hollow-core fiber.

This concept is also suitable for a reproducible and precise production process for anti-resonant hollow-core fibers on an industrial scale. It is in particular suitable for precisely producing anti-resonant hollow-core fibers with nested anti-resonance elements that have greatly differing internal diameters.

In a preferred method, a primary preform is formed in method step (a), which preform has an outer diameter in the range of 20 to 70 mm, preferably in the range of 30 to 70 mm.

This is hereby a comparatively large outer diameter. In the prior art, the outer diameters of the primary preforms are typically 4 to 6 mm.

It has also proven to be advantageous if the primary preform forms an inner sheath region in the secondary preform, which inner sheath region has an outer diameter in the range of 7 mm to 50 mm, preferably in the range of 20 mm to 50 mm.

The hollow core region and the material for the inner sheath region of the secondary preform are predetermined by the primary preform. This comprises the hollow core and an inner sheath region. An enlargement of the outer diameter of the primary preform can be achieved both by an enlargement of the hollow core (concomitantly with less attenuation) and by a reduction of the outer diameter of the final hollow-core fiber (concomitantly with less material input). An outer diameter of the inner sheath region of the secondary preform in the range of 7 mm to 50 mm, and in particular the range of 20 mm to 50 mm, represents a suitable compromise.

It has also proven to be useful if, upon drawing the hollow-core fiber in accordance with method step (c), an internal pressure in the core region is adjusted in the range between 0.05 mbar and 20 mbar, preferably in the range between 3 mbar and 20 mbar.

Given an internal pressure of less than 0.05 mbar, it may occur that the anti-resonance element preforms or anti-resonance element precursors inflate too much. Conversely, an internal pressure of more than 20 mbar in the core region can lead to the situation that the gas pressure within the hollow channels of the anti-resonance element preforms is insufficient for them to expand sufficiently in the hot-forming process.

The temperature of the heating zone during the hot-forming process should be as constant as possible. Therefore, in the hot-forming process in accordance with method step (d), a temperature-controlled heating element is advantageously used the setpoint temperature of which is kept accurate to +/−0.1° C.

Temperature fluctuations in the hot-forming process can thereby be limited to less than +/−0.5° C.

In a preferred method variant, the provision of the primary preform comprises arranging the anti-resonance element preforms at setpoint positions of the inner side of the cladding tube wall, wherein arranging the anti-resonance element preforms and/or drawing the hollow-core fiber in accordance with method step (c) comprises a fixing measure and/or a sealing measure using a sealing or bonding compound containing amorphous $SiO_2$ particles.

The sealing or bonding compound used for sealing or fixing contains amorphous $SiO_2$ particles which, for example, are accommodated in a dispersion liquid. This compound is applied between the surfaces to be bonded or sealed and is generally pasty during use. When dried at low temperature, the dispersion liquid is partially or completely removed and the compound is solidified. The sealing or bonding compound, and, in particular, the solidified $SiO_2$-containing sealing or bonding compound obtained after drying, satisfies the requirements for fixing and compacting. The low temperature of below 300° C. required for this purpose promotes compliance with the dimensional accuracy of the preform and avoids thermal impairments. By heating to higher temperatures, for example when elongating the preform to form the hollow-core fiber, the sealing or bonding compound is also suitable for forming opaque or transparent glass. This is done by sintering or vitrifying, wherein sintering to form opaque glass requires comparatively lower temperatures and/or short heating durations than vitrifying to complete transparency. The sealing or bonding compound can thus be compacted by heating and vitrified by heating in the hot-forming process.

In the hot-forming process, the sealing or bonding compound does not decompose and releases few impurities. It is thus characterized by thermal stability and purity in the hot-forming process and avoids deformations resulting from different thermal coefficients of expansion.

In a preferred method variant, the provision of the primary preform in accordance with method step (a) comprises arranging the anti-resonance element preforms at setpoint positions of the inner side of the cladding tube wall, wherein the arrangement of the anti-resonance element preforms takes place by means of a positioning template to be introduced into the inner cladding tube bore, which positioning template has retention elements for positioning the anti-resonance element preforms at the desired positions.

The positioning template has, for example, a shaft projecting into the inner cladding tube bore, which shaft is provided with retention elements in the form of several retaining arms pointing radially outward.

The structurally predetermined star-shaped arrangement of the retention elements facilitates the exact positioning of the anti-resonance element preforms at the respective setpoint positions and their fixing, for example by means of the sealing or bonding compound explained above. The positioning template is thereby preferably used exclusively in the region of the cladding tube end faces, preferably in the region of both cladding tube end faces.

The accuracy of the positioning of the preforms on the inner sheath surface of the cladding tube is improved in that the inner side of the cladding tube is produced by machining, in particular by drilling, milling, grinding, honing, and/or polishing.

In comparison to other known forming techniques, said machining techniques provide more precise and more filigree structures by using heat and pressure, and avoid contamination of surfaces by molding tools such as nozzles, presses, or fusion molds.

The machining preferably also comprises a structuring of the inner side of the cladding tube in the region of setpoint positions of the anti-resonance element preforms, in that this provided with a longitudinal structure extending in the direction of the longitudinal axis of the cladding tube. In the inner cladding tube wall, this longitudinal structure comprises, for example, longitudinal slots and/or longitudinal grooves which run parallel to the longitudinal axis of the cladding tube and which are preferably produced by drilling, sawing, milling, cutting, or grinding.

The longitudinal structure extending in the direction of the longitudinal axis of the cladding tube serves as a positioning aid for the anti-resonance element preforms. It makes it easier for the anti-resonance element preforms to assume predetermined defined positions on the inner side of the cladding tube.

A method has moreover proven to be useful in which, upon drawing the hollow-core fiber in accordance with method step (c), several constituents of the secondary preform made of quartz glass are together heated and softened, wherein the quartz glass of at least some of the preform constituents contains at least one dopant that lowers the viscosity of quartz glass.

Constituents of the preform include the cladding tube and the anti-resonance element preforms arranged therein, as well as additional sheath material which, for example, is provided in the form of one or more collecting cylinders and collapsed onto the primary preform. Fluorine, chlorine, and/or hydroxyl groups are preferably used as dopants lowering the viscosity of quartz glass.

Doping enables the adaptation of the thermal expansion coefficients of adjacent preform constituents in order to avoid or reduce stresses. It can also be used to reduce the thermal stability of a constituent in favor of the stability of an adjacent constituent.

For example, it has proven to be advantageous if, at a measured temperature of 1250° C., the quartz glass of the cladding tube has a viscosity higher by at least 0.5 dPa·s, preferably a viscosity higher by at least 0.6 dPa·s, than the quartz glass of additionally applied sheath material (with the viscosity given as a logarithmic value in dPa·s).

In particular with regard to a low optical attenuation and a large optical transmission bandwidth of the hollow-core fiber, it has proven to be particularly advantageous if the anti-resonance elements are arranged around the hollow core with an odd-numbered symmetry.

In a preferred method, the accuracy of the positioning of the preforms in the cladding tube is further improved in that tubular structural elements are provided, of which at least some have a wall thickness in the range of 0.2 and 2 mm, preferably a wall thickness in the range of 0.25 and 1 mm, and wherein a cladding tube is provided with an outer diameter in the range of 90 and 250 mm, and preferably with an outer diameter in the range of 120 to 200 mm. These components each have a length of at least 1 m. They are relatively high-volume structural elements for forming anti-resonance elements. This simplifies handling. In addition, given vertical arrangement of cladding tube and structural elements, the gravitational force supports the parallelity and vertical alignment of the longitudinal axes of the structural elements if the structural elements are respectively positioned and fixed at their upper end-face end at the setpoint position, for example and preferably using the sealing or bonding compound explained in more detail above, and additionally or as an alternative thereto by means of the positioning template explained in more detail above.

With regard to the production of the preform for the hollow-core fiber, the aforementioned technical object is achieved according to the invention, starting from a method of the aforementioned genus, in that a secondary preform is formed which has an outer diameter in the range of 30 to 90 mm, and at least one of the end-face ends of the anti-resonance element preforms is closed.

The secondary preform is a starting point for the production of the anti-resonant hollow-core fiber. The anti-resonant hollow-core fiber is drawn by elongating the preform.

A preform is produced which, in comparison to the prior art, has a large outer diameter in the range of 30 to 90 mm, preferably in the range of 40 to 90 mm, so that the existing absolute geometry error in the preform can be scaled down more strongly upon fiber drawing.

At least one of the end-face ends of the anti-resonance element preforms is closed before the fiber-drawing process. The end-face end to be closed is that end that, upon elongating the preform, represents the upper end given a vertically oriented longitudinal axis. The sealing of the anti-resonance element preform or anti-resonance element preforms also remains during the fiber-drawing process.

This method enables a more precise production of the hollow-core fiber. Measures for producing the preform are explained further above in connection with the production of the hollow-core fiber, and these explanations are herewith incorporated.

Definitions

Individual method steps and terms of the above description are additionally defined below. The definitions are part of the description of the invention. The statements made in the specification are definitive in the event of a factual contradiction between one of the following definitions and the remaining specification.

Anti-Resonance Elements

The anti-resonance elements may be single or nested structural elements of the hollow-core fiber. They have at least two walls which, when viewed from the direction of the hollow core, have a negative curvature (convex) or do not have a curvature (planar, straight). They normally consist of a material that is transparent to the working light, for example glass, in particular doped or undoped $SiO_2$, a plastic, in particular a polymer, a composite material, or crystalline material.

Anti-Resonance Element Preform/Anti-Resonance Element Precursor

What are referred to as anti-resonance element preforms are components or constituents of the preform that essentially become anti-resonance elements in the hollow-core fiber by simple lengthening during the fiber-drawing process. Components or constituents of the preform that are first formed into anti-resonance element preforms or directly into anti-resonance elements by forming are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element may be a further tube which bears against the inner sheath surface of the outer tube. The outer tube is referred to as an "outer anti-resonance element tube" or an "ARE outer tube" for short, and the further tube is referred to as an "inner anti-resonance element tube" or an "ARE inner tube" for short, or also as a "nested ARE inner tube."

In the case of multiple nested anti-resonance element preforms, at least one further structural element, for example a third tube abutting against the inner sheath surface of the nested ARE inner tube, may be arranged in the inner bore of the nested ARE inner tube. Where there are multiple nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products in which the original anti-resonance element preforms are present in a shape that has been modified compared to the original shape. The modified shape is also referred to herein as an anti-resonance element preform or also as an anti-resonance element precursor.

Preform/Primary Preform/Secondary Preform/Core Preform (Cane)

The preform is that component from which the anti-resonant hollow-core fiber is drawn. It is a primary preform, or a secondary preform produced by further processing of the primary preform. The primary preform may be present as an ensemble consisting of at least one cladding tube and preforms or precursors for anti-resonance elements that are loosely accommodated or firmly fixed therein. The further processing of the primary preform into a secondary preform from which the hollow-core fiber is drawn may comprise a single or repeated implementation of one or more of the following hot-forming processes:
 (i) elongation,
 (ii) collapse,
 (iii) collapse and simultaneous elongation,
 (iv) collapse of additional sheath material,
 (v) collapse of additional sheath material and subsequent elongation,
 (vi) collapse of additional sheath material and simultaneous elongation.

A preform obtained by collapsing and/or elongating a primary preform is referred to in the literature as a cane. Typically, it is encased with additional sheath material before or during drawing of the hollow-core fiber.

Elongating/Collapsing

During elongation, the primary preform is lengthened. The lengthening can take place without simultaneous collapse. Elongation can take place true to scale so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. The collapse is normally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" which has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The "inner side of the tube" designation is also used as a synonym for "inner sheath surface of the tube" and the "outer side of the tube" designation is also used as a synonym for "outer sheath surface of the tube." The term "inner bore" in conjunction with a tube does not mean that the inner bore has been produced by a drilling process.

Machining

This refers to subtractive mechanical manufacturing methods for the subtractive processing of a workpiece, in particular turning, cutting, drilling, sawing, milling and grinding. Via this machining, a longitudinal structure extending in the direction of the longitudinal axis of the cladding tube is achieved that serves as a positioning aid for the anti-resonance element preforms. The longitudinal structure is accessible from the inner side of the cladding tube; it may also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$ and $D_{90}$ values. The $D_{10}$ value thereby characterizes that particle size that is not achieved by 10% of the cumulative volume of the $SiO_2$ particles, and accordingly the $D_{50}$ value and the $D_{90}$ value characterize the particle sizes that are not achieved by 50% or by 90%, respectively, of the cumulative volume of the $SiO_2$ particles. The particle size distribution is determined by scattered light and laser diffraction spectroscopy according to ISO 13320.

EXEMPLARY EMBODIMENT

The invention is explained in more detail below with reference to an exemplary embodiment and a drawing. The following are shown in detail in schematic representation.

In the production of the hollow-core fiber or the preform for the hollow-core fiber, a plurality of components are to be connected together. Moreover, it can be helpful to seal existing gaps or channels of the preform when implementing hot-forming processes. For bonding or sealing, a sealing or bonding compound based on $SiO_2$ is used, as is known from DE 10 2004 054 392 A1. An aqueous slip containing amorphous $SiO_2$ particles, having a particle size distribution characterized by a $D_{50}$ value of approximately 5 μm and by a $D_{90}$ value of approximately 23 μm, is thereby produced by wet grinding of quartz glass grit. Further amorphous $SiO_2$ grit with a mean grain size of approximately 5 μm is mixed with the base slip. The slip used as a bonding compound has a solid content of 90%, which consists of at least 99.9 wt. % $SiO_2$.

Figure 1:
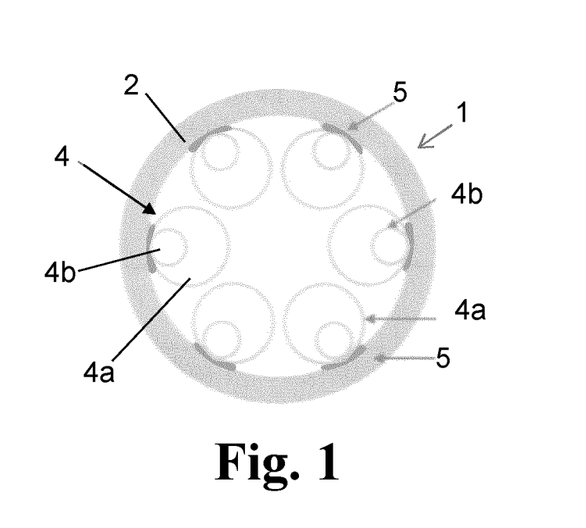
FIG. 1 a primary preform having a cladding tube and anti-resonance element preforms positioned and fixed therein for producing a preform for a hollow-core fiber, in a plan view of the cross-section, and FIG. 2 the primary preform of FIG. 1 after closing the anti-resonance element preforms for the purpose of implementing the fiber-drawing process.

FIG. 1 schematically shows a primary preform with a cladding tube 1 having a cladding tube wall 2, to the inner sheath surface of which are fixed anti-resonance element preforms 4 at previously defined azimuthal positions with uniform spacing; in the exemplary embodiment, there are six preforms 4; in another preferred embodiment (not shown), there are an odd number of preforms.

The cladding tube 1 consists of quartz glass and has a length of 700 mm, an outer diameter of 27 mm, and an internal diameter of 20 mm. The anti-resonance element preforms 4 are present as an ensemble of nested structural elements consisting of an ARE outer tube 4a and an ARE inner tube 4b. The ARE outer tube 4a has an outer diameter of 6.2 mm, and the ARE inner tube 4b has an outer diameter of 2.5 mm. The wall thicknesses of both structural members (4a; 4b) are the same and are 0.3 mm. The lengths of ARE outer tube 4a and ARE inner tube 4b correspond to the cladding tube length 1.

The anti-resonance element preforms 4 are fixed to the inner side of the cladding tube 1 by means of the bonding compound 5 based on $SiO_2$.

The bonding compound 5 is applied locally to the inner sheath surface of the cladding tube in the region of the end-face ends, and the anti-resonance element preforms are placed thereon using a positioning template with a structurally predetermined star-shaped arrangement of retention arms for the individual anti-resonance element preforms 4. The positioning template is thereby limited to the region around the two end-face cladding tube ends.

A precise and reproducible connection between the cladding tube 1 and the anti-resonance element preforms 4 is achieved via this method. A solidification of the bonding compound 5 at a low temperature below 300° C. is sufficient for fixing so that a strong heating of the surrounding regions, and thus a deformation of anti-resonance element preforms 4, is avoided.

The primary preform 1 is encased with a collecting cylinder made of quartz glass, wherein the collecting cylinder collapses onto the cladding tube 1 and, at the same time, the tube ensemble is elongated to form a secondary preform. The collecting cylinder has an outer diameter of 63.4 mm and a wall thickness of 17 mm.

Upon the collapse and elongation process, the coaxial arrangement of cladding tube 1 and collecting cylinder is fed from below, given a vertically oriented longitudinal axis, to a temperature-controlled heating zone, and softens therein zone by zone starting with the upper end of the arrangement.

The heating zone is kept at a setpoint temperature of 1600° C. with a control accuracy of +/−0.1° C. Temperature fluctuations in the hot-forming process can thereby be limited to less than +/−0.5° C.

The secondary preform (core preform) formed in the collapse and elongation process has an outer diameter of approximately 50 mm and a sheath wall thickness of 16.6 mm, composed of an outer sheath and an inner sheath. The maximum wall thickness variation (largest value minus smallest value) of the anti-resonance element preforms is less than 4 μm. The secondary preform is subsequently drawn to form the anti-resonant hollow-core fiber.

Figure 2:
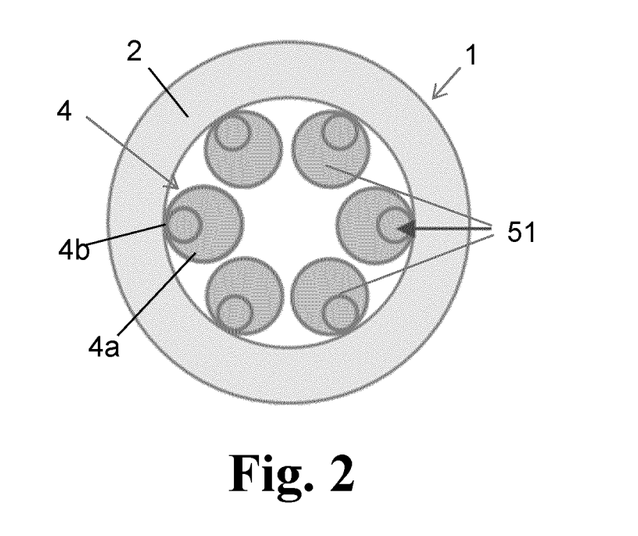

All anti-resonance element preforms are closed beforehand with the sealing or bonding compound. This state is schematically indicated in FIG. 2 by means of dark gray-colored surfaces. The closure compound 51 is thereby applied only to that end face of the anti-resonance element preforms 4 that faces upward during the fiber-drawing process.

The upward-facing end face is connected to a retention tube made of quartz glass, which simultaneously serves as a gas connection. The retainer is fixed to the collecting cylinder and to the cladding tube by means of the sealing or bonding compound.

In the fiber-drawing process, the secondary preform with a vertically oriented longitudinal axis is supplied from above to a temperature-controlled heating zone and softens therein, zone by zone, starting at the lower end. At the same time, gas is supplied to the core region (hollow core) so that an internal pressure of 4 mbar is established in the core region.

The heating zone is kept at a setpoint temperature of approximately 2100° C. with a control accuracy of +/−0.1° C. Temperature fluctuations in the hot-forming process can thereby be limited to less than +/−0.5° C.

By drawing the preform to form the hollow-core fiber, the existing absolute geometry error is scaled down so that, in the hollow-core fiber, the anti-resonance elements obtained from the anti-resonance element preforms have a maximum deviation of less than 3.5% in the wall thickness.

outer diameters (OD) or internal diameters (ID) of preforms and constituents thereof are summarized in the following table depending on the desired diameter ratio (OD/ID) between the external and internal diameters of the sheath region of the hollow-core fiber.

TABLE 1

| No. | OD/ID | Fiber OD/ID | OD (secondary preform) (mm) | ID (former primary preform) (mm) | OD (former primary preform) (mm) |
|---|---|---|---|---|---|
| 1 | 2.3 | 230/98 | 90 | 38 | 46 |
| 2 | 2.9 | 230/80 | 90 | 31 | 39 |
| 3 | 2.0 | 200/98 | 90 | 44 | 53 |
| 4 | 2.3 | 230/98 | 30 | 13 | 15 |
| 5 | 2.9 | 230/80 | 30 | 10 | 13 |
| 6 | 2.0 | 200/98 | 30 | 15 | 18 |
| 7 | 3.0 | 230/98 | 50 | 16.8 | 22.2 |
| 8 | 2.3 | 230/98 | 25 | 11 | 13 |
| 9 | 2.3 | 230/98 | 100 | 43 | 51 |
| 10 | 4.0 | 230/90 | 50 | 12.5 | 18.8 |

The value for OD/ID in table column 2 results from dividing the values of columns 4 (outer diameter of the secondary preform) and 5 (internal diameter of the former primary preform in the secondary preform). The maximum deviation of the wall thickness of the anti-resonance element preforms in the preform is approximately 4 µm in all exemplary embodiments. Hollow-core fibers with an outer diameter of 200 µm or 230 mm were drawn from the preforms, as indicated in the table above, and the wall thicknesses of the anti-resonance elements were determined. In all examples, the error in the wall thickness of the anti-resonance elements was less than 3.5% (relative to the mean wall thickness).

Example no. 7 of the table corresponds to the exemplary embodiment described in detail above. Examples 8 and 9 are comparative examples. In the fiber-drawing process using the preforms of the comparative examples, hollow-core fibers were respectively obtained in which the error in the wall thickness of the anti-resonance elements was more than 4%. In comparative example 8, this insufficient result is attributed to the comparatively small drawing ratio and, in comparative example 9, to the temperature gradients within the preform volume in the fiber-drawing process.

The invention claimed is:

1. A method for producing an anti-resonant hollow-core fiber having a hollow core extending along a longitudinal axis of the hollow-core fiber and a sheath surrounding the hollow core and including a plurality of anti-resonance elements, the method comprising the steps of:
  (a) providing a primary preform for the hollow-core fiber, having a hollow core region and a sheath region including at least one cladding tube having an inner cladding tube bore and a longitudinal cladding tube axis, along which a cladding tube wall delimited by an inner sheath surface and an outer sheath surface extends, wherein a number of tubular and/or hollow channel-shaped anti-resonance element preforms having end-face ends are arranged in the sheath region;
  (b) further processing the primary preform into a secondary preform, the further processing including a singular or repeated implementation of one or more of the following hot-forming processes:
    (i) elongating the primary preform,
    (ii) collapsing and simultaneously elongating the primary preform,
    (iii) adding and collapsing additional sheath material and subsequently elongating the primary preform,
    (iv) adding and collapsing additional sheath material and simultaneously elongating the primary preform; and
  (c) closing at least one of the end-face ends of the anti-resonance element preforms and then drawing the hollow-core fiber from the secondary preform,
  wherein the secondary preform is formed which has an outer diameter in the range of 30 to 90 mm.

2. The method according to claim 1 wherein, in accordance with method step (a), the primary preform provided has an outer diameter in the range of 20 mm to 70 mm.

3. The method according to claim 2, wherein the primary preform forms, in the secondary preform, an inner sheath region which has an outer diameter in the range of 7 mm to 50 mm.

4. The method according to claim 1, wherein the primary preform forms, in the secondary preform, an inner sheath region which has an outer diameter in the range of 7 mm to 50 mm.

5. The method according to claim 1, wherein upon drawing the hollow-core fiber in accordance with method step (c) the core region has an internal pressure in the range between 0.05 mbar and 20 mbar.

6. The method according to claim 1, wherein during method step (b), a temperature-controlled heating element is used the setpoint temperature of which is kept accurate to +/−0.1° C.

7. The method according to claim 1, further comprising fixing and/or sealing using a sealing or bonding compound containing amorphous $SiO_2$ particles to arrange the anti-resonance element preforms at setpoint positions on an inner side of the cladding tube wall and/or to draw the hollow-core fiber in accordance with method step (c).

8. The method according to claim 7, further comprising machining at the setpoint positions to provide an inner side of the cladding tube with a longitudinal structure extending in the direction of the longitudinal axis of the cladding tube.

9. The method according to claim 1, further comprising introducing a positioning template having retention elements into the inner cladding tube bore and, when providing the primary preform in accordance with method step (a), the anti-resonance element preforms are arranged at setpoint positions on an inner side of the cladding tube wall using the retention elements.

10. The method according to claim 9, wherein the positioning template has a shaft projecting into the inner cladding tube bore, which shaft has a plurality of retention arms pointing radially outward.

11. The method according to claim 1, further comprising machining an inner side of the cladding tube.

12. The method according to claim 11, wherein the step of machining includes drilling, milling, grinding, honing, and/or polishing.

13. The method according to claim 1, wherein the secondary preform is made of quartz glass having a plurality of constituents and at least one dopant that lowers the viscosity of quartz glass and, when drawing the hollow-core fiber in accordance with method step (c), the constituents of the secondary preform made of quartz glass are together heated and softened.

14. The method according to claim 13, wherein the cladding tube and the added additional sheath material are each made of quartz glass and the quartz glass of the cladding tube, at a measured temperature of 1250° C., has a viscosity higher by at least 0.5 dPa·s than the quartz glass of the added additional sheath material (with the viscosity given as a logarithmic value in dPa·s).

15. The method according to claim 14, wherein the quartz glass of the cladding tube, at a measured temperature of 1250° C., has a viscosity higher by at least 0.6 dPa·s than the quartz glass of the added additional sheath material (with the viscosity given as a logarithmic value in dPa·s).

16. A method for producing a preform for an anti-resonant hollow-core fiber having a hollow core extending along a longitudinal axis of the hollow-core fiber and a sheath surrounding the hollow core, the sheath including a plurality of anti-resonance elements, the method comprising the steps of:
   (a) providing a primary preform for the hollow-core fiber, having a hollow core region and a sheath region including at least one cladding tube having an inner cladding tube bore and a longitudinal cladding tube axis, along which a cladding tube wall delimited by an inner sheath surface and an outer sheath surface extends, wherein a number of tubular and/or hollow-channel-shaped anti-resonance element preforms having end-face ends are arranged in the sheath region; and
   (b) further processing the primary preform into a secondary preform, the further processing including a singular or repeated implementation of one or more of the following hot-forming processes:
      (i) elongating the primary preform,
      (ii) collapsing and simultaneously elongating the primary preform,
      (iii) adding and collapsing additional sheath material and subsequently elongating the primary preform,
      (iv) adding and collapsing additional sheath material and simultaneously elongating the primary preform,
   wherein the secondary preform is formed which has an outer diameter in the range of 30 to 90 mm, and at least one of the end-face ends of the anti-resonance element preforms is closed.

17. The method according to claim 16 wherein, in accordance with method step (a), the primary preform provided has an outer diameter in the range of 20 mm to 70 mm.

18. The method according to claim 16, wherein the primary preform forms, in the secondary preform, an inner sheath region which has an outer diameter in the range of 7 mm to 50 mm.

19. The method according to claim 16, wherein during method step (b), a temperature-controlled heating element is used the setpoint temperature of which is kept accurate to +/−0.1° C.

20. A method for producing an anti-resonant hollow-core fiber having a hollow core extending along a longitudinal axis of the hollow-core fiber and a sheath surrounding the hollow core and including a plurality of anti-resonance elements, the method comprising the steps of:
   (a) providing a primary preform with an outer diameter in the range of 20 mm to 70 mm for the hollow-core fiber, having a hollow core region and a sheath region including at least one cladding tube having an inner cladding tube bore and a longitudinal cladding tube axis, along which a cladding tube wall delimited by an inner sheath surface and an outer sheath surface extends, wherein a number of tubular and/or hollow channel-shaped anti-resonance element preforms having end-face ends are arranged in the sheath region;
   (b) further processing the primary preform into a secondary preform having an inner sheath region with an outer diameter in the range of 7 mm to 50 mm, the further processing using a temperature-controlled heating element the setpoint temperature of which is kept accurate to +/−0.1° C. and including a singular or repeated implementation of one or more of the following hot-forming processes:
      (i) elongating the primary preform,
      (ii) collapsing and simultaneously elongating the primary preform,
      (iii) adding and collapsing additional sheath material and subsequently elongating the primary preform,
      (iv) adding and collapsing additional sheath material and simultaneously elongating the primary preform; and
   (c) closing at least one of the end-face ends of the anti-resonance element preforms and then drawing the hollow-core fiber from the secondary preform, wherein the core region has an internal pressure in the range between 0.05 mbar and 20 mbar and the secondary preform is formed which has an outer diameter in the range of 30 to 90 mm.

\* \* \* \* \*